Dec. 31, 1940.                J. F. CARD                2,226,705
                REGULATOR FOR ENGINE DRIVEN GENERATORS
                Filed Sept. 6, 1938          4 Sheets-Sheet 1
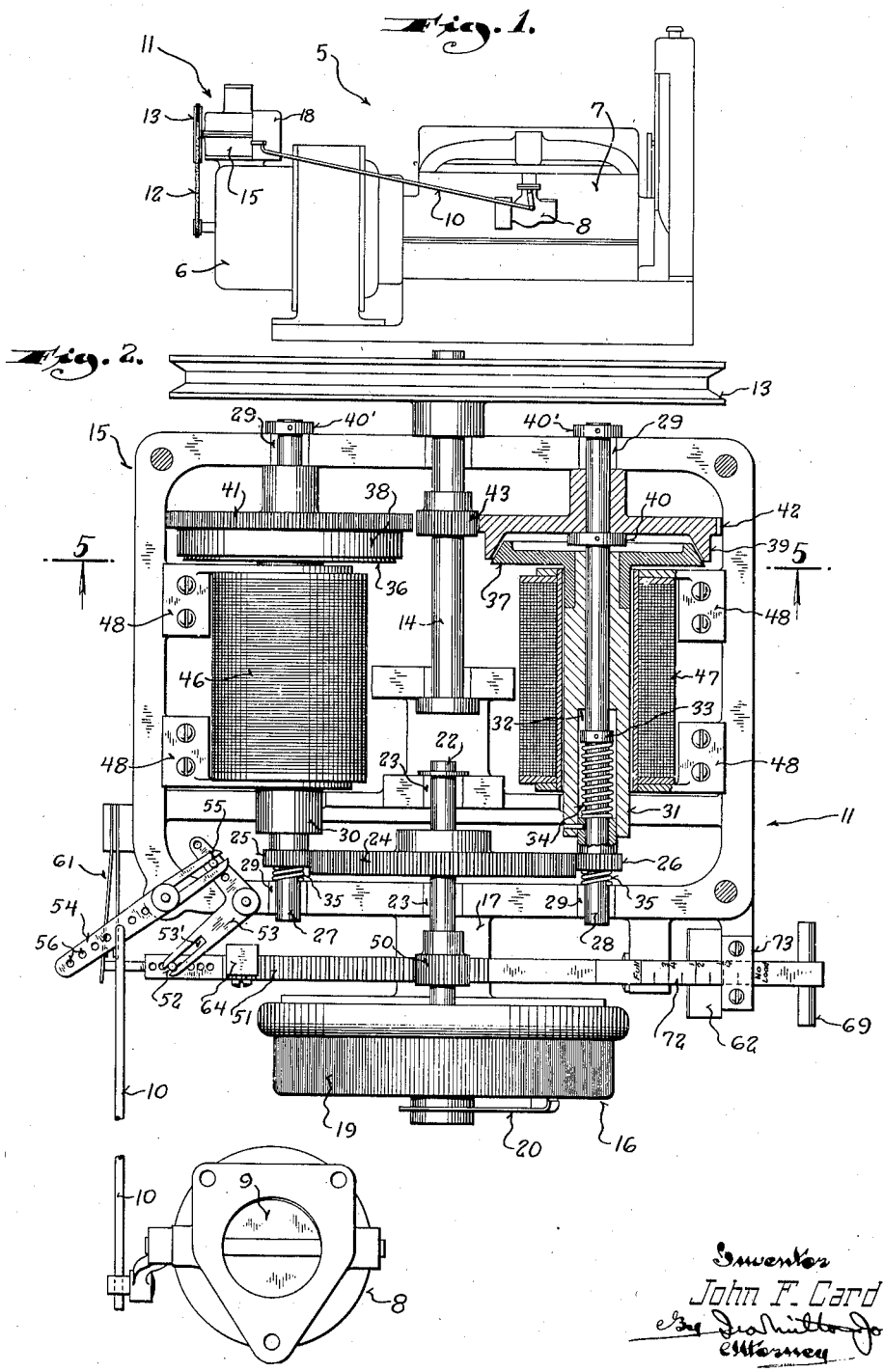

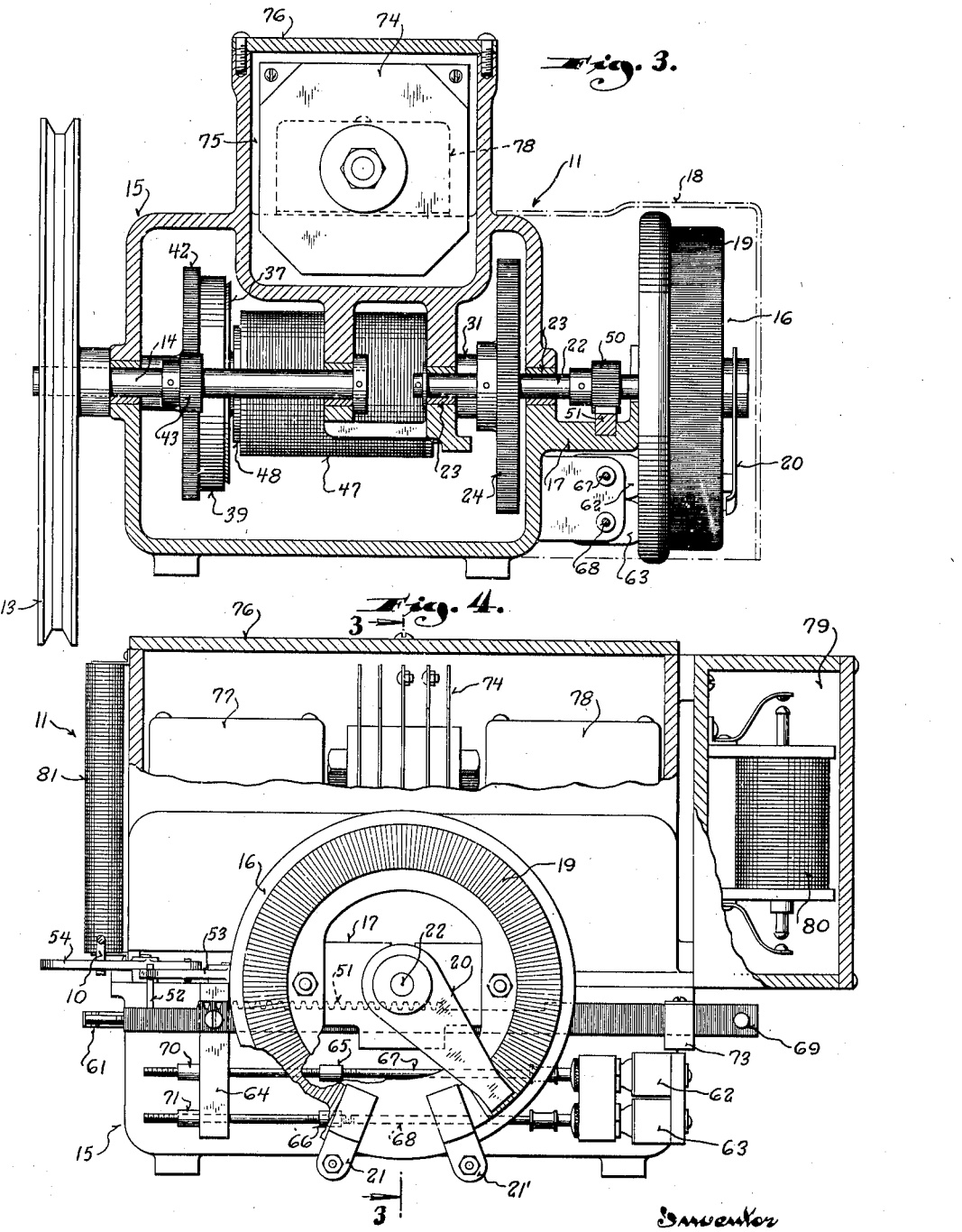

Dec. 31, 1940.   J. F. CARD   2,226,705
REGULATOR FOR ENGINE DRIVEN GENERATORS
Filed Sept. 6, 1938   4 Sheets-Sheet 3
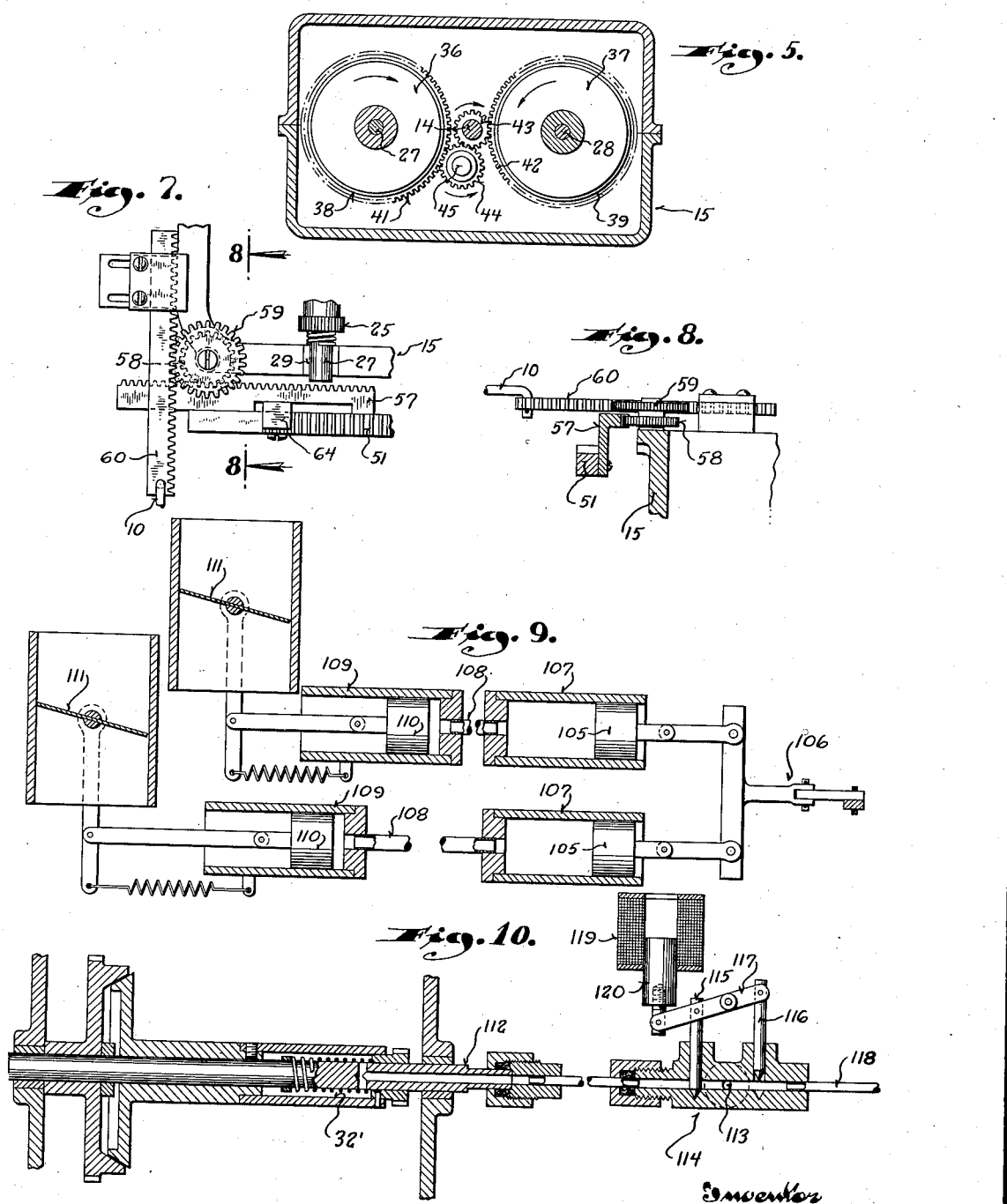
Inventor
John F. Card Patented Dec. 31, 1940

2,226,705

UNITED STATES PATENT OFFICE 2,226,705

REGULATOR FOR ENGINE DRIVEN GENERATORS

John F. Card, Gladstone, Mich.

Application September 6, 1938, Serial No. 228,479

3 Claims. (Cl. 290—40)

This invention relates to regulators for engine or motor driven electric generators, and refers particularly to regulators for electric generator units either A. C. or D. C. driven by internal combustion engines and used as a source of electric energy in locations which may not be served by power lines, or as stand-by units in department stores, airports, etc., or any place requiring power or light, or both.

In units of this type, it is desirable to coordinate the generator output with the load demand. Regulators heretofore in use for this purpose controlled or regulated the voltage of the generator, but did not in anywise safeguard either the generator or the engine against overload, and several other abnormal occurrences which will appear as the description proceeds.

This invention, therefore, has as one of its objects to provide a regulator for the purpose described which not only controls the voltage of the generator and speed of the engine and holds them within close limits, but also protects both the generator and the engine against dangerous overloads or other abnormal conditions.

Another object of this invention is to provide a regulator of the character described which in addition to its voltage control of the generator at various loads, also governs the speed of the engine so as to coordinate the same within close limits with the load demand on the generator.

More specifically it is an object of this invention to provide a regulator of the character described which controls the voltage of the generator by adjusting a variable resistance connected in series with the shunt field windings of the generator, or exciter and wherein the mechanical motion necessary to effect such adjustment is utilized to govern the speed of the engine and actuate controlling switches which disrupt operation of the entire unit whenever an overload or other abnormal condition occurs.

Another object of this invention is to provide novel means for utilizing the mechanical motion produced by the regulator for disrupting the operation of the entire unit by which an overload either on the generator or the engine serves to shut down the entire plant by opening the engine ignition circuit or the shunt fields of the generator or exciter.

Another object of this invention is to provide a regulator for the purpose described which may be conveniently driven from the shaft of the generator or from any other suitable power source, and which has sufficient power to control a number of separate engines and generators.

Another object of this invention is to provide an improved electromagnetic clutch for selectively actuating and varying the resistance in the field circuit of the generator, or exciter in which the armature is mounted for axial and rotary motion.

Another object of this invention is to provide a regulator which will preclude starting the engine when its throttle is in open or partially open position where it is left by response of the regulator to an overload or other abnormal condition.

Another object of this invention is to provide a regulator wherein the motive power for producing the mechanical motion necessary to vary the resistance introduced in the field windings and also for actuating the various control switches may be produced by fluid pressure.

A further object of this invention is to provide a regulator which may be set at the factory to maintain certain conditions and which is sufficiently compact to be completely housed within a sealed casing so as to preclude tampering with the adjustments.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate several complete examples of the physical embodiment of the invention constructed in accordance with the best modes so far devised for the practical application of the principles thereof, and in which:

Figure 1 is a view in side elevation of a conventional generator plant illustrating the application of this invention thereto;

Figure 2 is a top plan view of the regulator per se with the cover of its casing removed, and parts broken away and in section;

Figure 3 is a cross sectional view taken through Figure 4 on the plane of the line 3—3;

Figure 4 is a front view of the regulator with parts broken away and in section;

Figure 5 is a sectional view taken through Figure 2 on the plane of the line 5—5;

Figure 7 is a top plane view of a modified form of motion transmitting mechanism for actuating the throttle valve of the carburetor;

Figure 8 is a detail sectional view through Figure 7 on the plane of the line 8—8;

Figure 9 is a view in section to illustrate how the regulator may be employed to control a number of engines; and Figure 10 is a view illustrating the manner in which fluid pressure may be utilized to effect engagement of the driving clutches.

Figure 6:
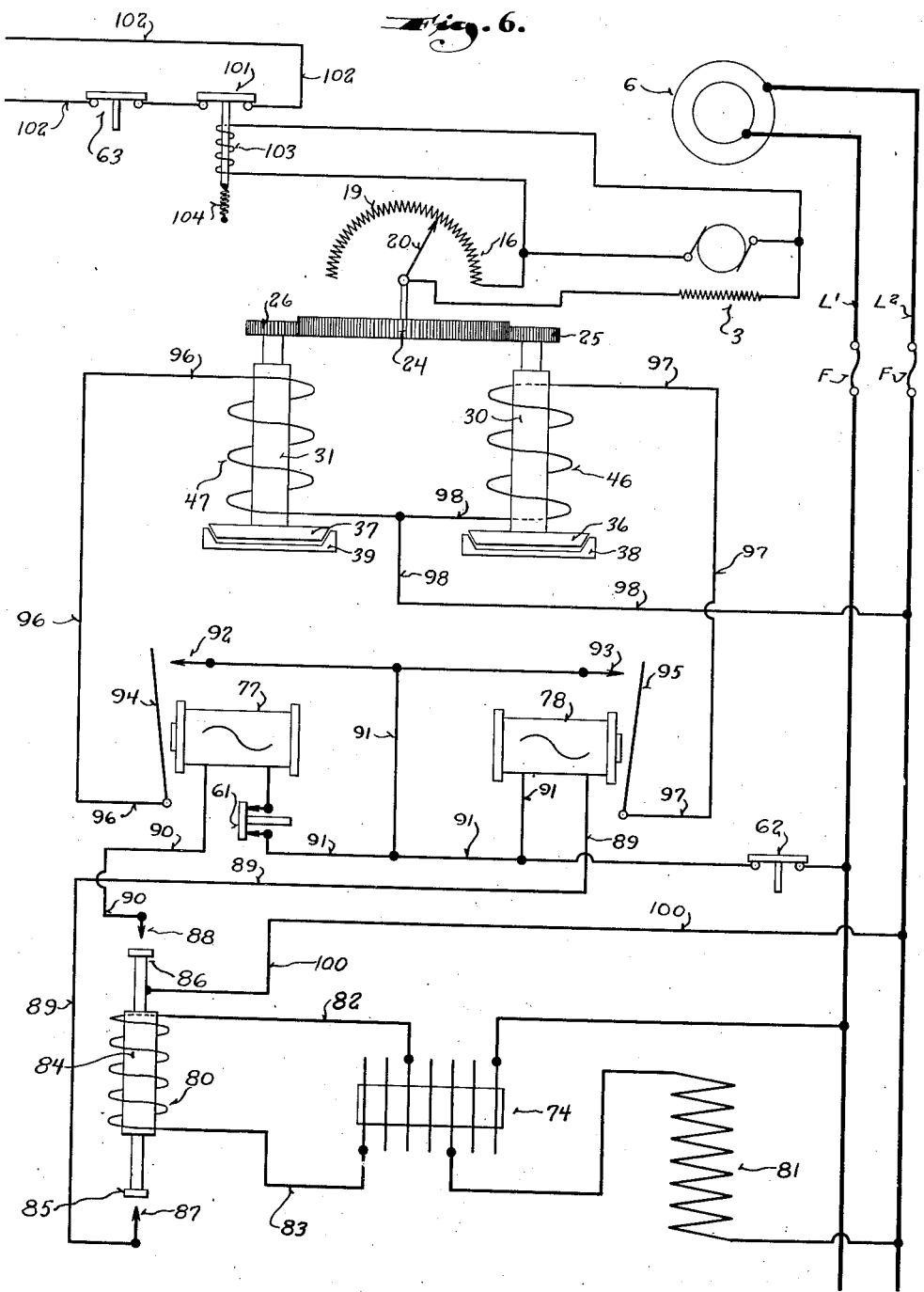
Figure 6 is a diagrammatic view illustrating the circuit connections of the regulator.

Referring now particularly to the accompanying drawings in which like numerals indicate like parts, the numeral 5 designates generally an electric generator plant of the self-excited A. C. type or shunt wound D. C. type comprising a generator 6 driven by an internal combustion engine 7. The details of the generator and the engine form no part of this invention, and consequently, are not shown.

The engine, as is customary, has a carburetor 8 provided with a throttle valve 9 adapted to be opened and closed by means of a link 10, which is actuated as one of the functions of the regulator of this invention, indicated generally by the numeral 11.

The regulator 11 is preferably mounted on some part of the generator, as shown, so that it may be driven from the generator or exciter shaft by a belt 12 trained about a small pulley on the generator or exciter shaft, and a large pulley 13 fixed to the main shaft 14 of the regulator. Any other suitable form of power transmission may be employed, and, if desired, the regulator may even be mounted at a distance from the generator and driven by a separate motor.

The component parts of the regulator are all housed within a casing 15 comprising complementary upper and lower sections separable on a median horizontal plane. Inasmuch as one of the main functions of the regulator is to vary a special or extraneous resistance connected with the field windings of the generator, or exciter, a rheostat 16 of adequate resistance current capacity and dimensions constitutes one of its most important parts.

To facilitate the dissipation of heat developed by the rheostat, it is mounted outside the casing 15 on a bracket 17 formed as an integral part of the lower casing section. A cover 18 carried by the casing preferably extends over the rheostat to protect the same without interfering with its proper ventilation.

The rheostat is of conventional construction comprising a coil of resistance wire 19 mounted on a suitable support in circular formation to have a contactor arm 20 slide thereacross and vary its effective resistance. One terminal 21 of the rheostat connects with one end of its resistance coil, and its other terminal 21' is connected with the contactor arm 20 in the customary manner.

The contactor arm 20 is secured to the outer end of a shaft 22 through an insulating bushing pinned to the shaft. This shaft is journalled in two bearings 23 carried by the casing 15.

Directly inside the end wall of the casing from which the bracket 17 projects, between the two bearings 23, the shaft 22 has a large gear 24 fixed thereto. This gear meshes with two pinions 25 and 26. These pinions are slidably mounted on shafts 27 and 28, respectively, both mounted in bearings 29 which, like the bearings 23, are carried by the upper and lower sections of the casing so as to facilitate assembly of the parts.

Slidably mounted on the shafts are cylindrical armature cores 30 and 31, respectively, the front end of each of which is counterbored as at 32 with the end of the counterbore closed by its respective pinion which is secured in place in any suitable manner. Inside the counterbore 32, each shaft has a collar 33 fixed thereto between which and the hub of the pinion, a compression spring 34 is confined. The springs 34 thus yieldingly urge the assembled armature cores and pinions toward the large gear 24.

This motion of the assembled armature cores and pinions is limited by small springs 35 interposed between the pinions and the adjacent wall of the casing. These springs 35, however, are lighter than the springs 34 so that the assembled armature cores and pinions are definitely but yieldingly held in positions at which cone clutches with which the shafts are equipped are inoperative.

These cone clutches comprise cones 36 and 37 fixed respectively to the armature cores 30 and 31, and complementary hollow or outer cones 38 and 39. The hollow outer cones 38 and 39 have hubs which bear against the adjacent end wall of the casing, and collars 40 fixed to their respective shafts inside a space provided between the hollow outer cones and their respective inner cones and collars 40' on the outer ends of the shafts serve to hold the hollow cones and the shafts against endwise motion.

If desired, these clutches may be flat-faced with suitable friction material between or any other design that will best serve the purpose.

The hollow cones 38 and 39 have ring gears 41 and 42, respectively, the latter meshing with a pinion 43 fixed to the main shaft 14, which, as heretofore noted, is continuously driven from the generator, and the former meshing with a pinion 44, which in turn meshes with the pinion 43, the pinion 44 being mounted on a stub shaft 45 suitably journalled in the adjacent wall of the casing. In this manner, one of the hollow outer cones is continuously driven in one direction, and the other is continuously driven in the opposite direction. The directions of rotation of the hollow cones are indicated by arrows in Figure 5.

Encircling the armature cores 30 and 31 are solenoids 46 and 47, respectively. These solenoids are held in place by brackets 48 fixed to the adjacent side walls of the lower section of the casing. Inasmuch as the armature cores are free to slide and rotate inside their respective solenoids, it will be readily apparent that upon energization of the solenoids, the armature cores will be drawn endwise in a direction to engage their respective cone clutches, whereupon rotation is transmitted to their respective pinions to drive the contactor arm 20 of the rheostat in one direction or the other. So that the pinions and cone clutches will not affect the response of the armature cores, these parts are formed of nonmagnetic metal.

Attention is particularly directed to the fact that the cylindrical armature cores have both an endwise and a rotary motion, and that power is transmitted therethrough. In other words, the armature cores themselves constitute part of the chain of power transmitting elements.

The energization of the solenoids 46 and 47 to effect adjustment of the rheostat in the manner described is controlled automatically in consequence to the fluctuations in voltage and load demand on the generator. The manner in which this is effected will be described in detail hereinafter.

It is to be observed that the shaft 22 which carries the contactor arm of the rheostat also has a pinion 50 fixed thereto which meshes with a rack bar 51 slidably mounted on the bracket 17. The linear motion of this rack bar 51 in consequence to adjustment of the rheostat is utilized to govern the throttle valve 9 of the engine and also to control the various switches with which the regulator is equipped.

To transmit motion to the throttle valve of the engine, one end of the rack bar has a pin 52 projecting upwardly therefrom to engage in a slot 53' in one arm of a bell crank lever 53 pivotally mounted from the lower casing section so that by linear motion of the rack bar, the bell crank lever is swung one way or the other. This movement of the bell crank is transmitted to a lever 54 likewise pivotally mounted from the casing, through a pin and slot connection 55.

The outer end of the lever 54 has a plurality of holes 56, into any one of which the adjacent end of the link 10 is inserted, depending upon the range of motion required to carry the throttle valve 9 from one limit of motion to the other. Adjustment is further provided by having a plurality of holes for the pin and slot connection 55, and likewise, the pin 52 may be secured at different positions along the length of the rack bar 51 by virtue of the series of holes in the rack bar.

With this construction, the motion of the throttle valve is not directly proportional to that of the rack bar 51, but varies from a slow motion with no load to a more rapid motion during opening of the throttle, as the load increases which is desirable. For a directly proportional motion transmission from the rack bar to the throttle, the construction illustrated in Figures 7 and 8 may be used. As here shown, the rack bar 51 carries another laterally disposed rack 57 which meshes with a pinion 58. This pinion has a gear 59 secured thereto to mesh with and drive a slidably mounted rack 60 to which the link 10 is attached to transmit motion to the carburetor throttle directly proportional to that of the rack bar 51.

By changing the diameter of the gear 59, the ratio of movement of the rack 60 to the rack 51 may be increased or decreased to suit the opening or closing of the carburetor throttle to maintain the desired engine speed at all loads.

The motion of the rack bar 51 is also used to open a switch 61 when the regulator reaches its limit of motion corresponding to the no-load condition of the generating plant. This switch 61 may be of any conventional construction, and in the present instance is shown as two spring blades normally contacting but separable by movement of the rack bar.

The switch is so connected with the circuits which energize the solenoids 46 and 47 that the solenoid used to render the regulator effective to cut out resistance from the field circuit of the generator as the load on the generator drops, is rendered ineffective when the no-load position is reached so as to preclude carrying the contactor arm of the rheostat too far in that direction.

Two other switches are actuated by linear motion of the rack bar 51. These two switches, designated 62 and 63 are of the type which remain in their positions to which they have been last actuated and under normal conditions are closed.

Their purpose is to completely disrupt operation of the generator plant in the event of an overload either on the generator or the engine. They are actuated from the linear motion of the rack bar by means of a stop 64 fixed to and moving with the rack bar so as to engage stops 65 and 66 adjustably secured to actuating rods 67 and 68, respectively, the former being connected with the switch 62 and the latter with the switch 63.

The outer ends of these rods are slidably disposed in the movable stop 64 so as to remain stationary until the stop 64, upon movement of the rack bar 51 in one direction, strikes the stops 65 and 66, whereupon the rods are actuated to open their respective switches. They remain in this position until the regulator mechanism is returned to its no-load position by pushing in the rack bar 51, for which purpose a handle 69 is provided.

As the rack bar is pushed in to its no-load position, the moving stop 64 engages other adjustable stops 70 and 71 carried by the rods 67 and 68, respectively, to apply a pull on the rods and restore the switches 62 and 63 to their closed positions.

The various load conditions under which the plant is operating are conveniently indicated at all times by the motion of the rack bar 51 which may be provided with a scale 72 cooperating with a suitable indicator, such as the outer edge of a guide 73 in which the bar slides. Since the travel of the rheostat arm 20 is always the same for a given load condition, it follows that the scale 72 accurately indicates the load on the unit at all times.

Inasmuch as direct current is desirable for part of the electrical control, a rectifier 74 is provided. It is conveniently located in the upper half of the casing within its own compartment 75 to which access is had by removing a cover 76. The compartment 75 also houses two relays 77 and 78, and carried by one side wall of the casing within an enclosure 79 is a master relay 80, to be hereinafter more fully described. On the opposite side wall of the casing, a fixed resistance 81 is readily detachably mounted.

The coordinate functioning of these various electrical instrumentalities will now be described with relation to the diagram of Figure 6. This description will also constitute a description of the operation of the regulator.

As here shown, the output terminals of the generator 6, which may be single phase, two phase, or three phase, connect with alternating current power lines $L^1$ and $L^2$ in which line fuses F are interposed. The efficacy of the generator, as noted hereinbefore, is controlled by varying a special or extraneous resistance connected in series with the field winding 3 in the case of a separately excited generator, this special or extraneous resistance being provided by the rheostat 19 through adjustment of its contactor 20.

The rectifier 74 is connected across the lines $L^1$, $L^2$, through resistance 81 and its direct current secondary is connected directly with the ends of the master relay coil 80 by conductors 82 and 83. The value of the resistance 81 determines the normal voltage which the regulator maintains, for as long as the voltage on the lines $L^1$, $L^2$ remains between predetermined limits or is normal as determined by the value of the resistance 81, the armature 84 of the master relay floats in a neutral position at which contacts 85 and 86 carried thereby are spaced from cooperating stationary contacts 87 and 88, respectively.

The diagram shows the master relay in this position.

In the event the voltage on the line drops, the energization of the coil 80 depreciates correspondingly and the armature 84 drops by gravity to engage its contact 85 with the contact 87. Likewise, if the voltage on the line rises above normal, the energization of the master coil 80 increases, and as a consequence, the contact 86 engages the contact 88.

The closure of the circuits connected with the contacts 87 and 88 effects energization of one or the other of the main solenoids to in turn effect adjustment of the resistance in the field circuit of the generator or exciter. To this end, the contactors 85 and 86, which are electrically connected, are connected through a conductor 100 with line $L^2$. Contact 87 is connected through a conductor 89 with one side of the relay 78, and the contact 88 is connected through a conductor 90 with one side of the relay 77. The other sides of both relays are connected through a common conductor 91 with the line $L^1$, the normally closed switch 62 being connected in the conductor 91 and the normally closed switch 61 being connected in that branch of the conductor 91 which leads to the relay 77. Hence, opening of the switch 61 prevents energization of the relay 77, and opening of the switch 62 prevents energization of either of the relays.

The conductor 91 is also connected with two stationary contacts 92 and 93. The contact 92 is positioned to be engaged by a contactor 94 responsive to energization of the relay 77, and the contact 93 is positioned to be engaged by a contactor 95 upon energization of the relay 78.

The contactor 94 is connected through a conductor 96 with one side of the solenoid 47, and the contactor 95 is connected through a conductor 97 with one side of the solenoid 46. The other sides of the solenoids 46 and 47 are connected with the line $L^2$ through a conductor 98.

The circuits just described provide for energization of either of the solenoids 46 or 47 to cut out or insert resistance in the field windings through the medium of the rheostat 19 in accordance with the load and voltage requirements as they are manifested by response of the master relay 80.

To more specifically illustrate the manner in which this is accomplished, assume that the voltage on the line has dropped below normal in response to the application of a load on the generator. The consequent descent of the armature 84 of the master relay will engage its contactor 85 with the contact 87. Current will thus flow from line $L^2$ through conductor 100 to the conductor 89 which leads to one side of the relay 78, and the other side of the relay 78 being connected through line 91 and the closed switch 62 with line $L^1$, energization of the relay 78 will follow.

The energization of the relay 78 engages the contactor 95 with the contact 93, and as a result, the solenoid 46 is energized, current therefor being supplied through conductor 91 from line $L^1$, conductor 97 to one side of the solenoid, and conductor 98 to the other line $L^2$.

The energization of the solenoid 46 renders its associated magnetic clutch operative so that the core 30 of the solenoid 46 will be driven in a direction to move the rheostat arm 20 so as to lessen the resistance inserted in the field circuit of the generator by the rheostat 19. With this change in resistance in the field circuit of the generator, the efficacy of the generator rises to restore the line voltage to normal.

In the event the line voltage exceeds the predetermined normal, a consequent rise of the armature 84 of the master relay engages the contactor 86 with its contact 88, and as a result, a circuit is closed to energize the relay 77.

This circuit, beginning with line $L^2$, may be traced along conductor 100 to the contactor 86, contact 88, through conductor 90 to one side of the relay 77 and out through conductor 91 and the closed switches 61 and 62 to the other line $L^1$.

Energization of the relay 77 effects engagement of the contactor 94 with its contact 92, and as a result, current is conducted to the solenoid 47 in a manner readily traced on the diagram. The energization of the solenoid 47 renders its associated magnetic clutch operative, and as a consequence, the armature core 31 is driven in a direction to swing the rheostat arm 20 in a direction to insert resistance in the generator field circuit.

During adjustment of the rheostat as just described, the throttle valve of the engine is adjusted to correspondingly supply more fuel when the load increases and vice versa.

The ignition circuit for the engine is controlled by the switch 63 and a safety switch 101, both of which are shown in Figure 6 as connected in series in part of the ignition circuit represented by the conductor 102. The switch 63, as hereinbefore noted, is actuated by linear motion of the rack bar 51. It is normally closed and is opened when the regulator reaches the full load position to thus stop the engine, and in conjunction with the opening of the switch 62 which disrupts operation of the regulator, shuts down the entire unit, and as both of these switches remain open until the regulator has been manually restored to its no-load condition by pushing in the rack bar 51, it follows that the plant cannot be operated until the throttle of the engine has been restored to its no-load position. Naturally, if the overload condition persists, the regulator will immediately function to reopen the switches 62 and 63.

It is to be observed that the adjustability of the stops on the actuating rods of the switches 63 and 62 allows the regulator to be set to shut down the plant upon an overload on either the engine or the generator; conditions which are not at all necessarily concurrent.

The safety switch 101 in the ignition circuit is normally closed and is opened by energization of a solenoid 103 energized from the shunt field circuit of the generator or exciter. Under all normal conditions, the effect of energization of the solenoid 103 is offset by a biasing spring 104 acting on the switch 101, but in the event the line fuses F blow as a result of an unusual and suddenly applied load on the line, the instantly rising voltage of the generator or exciter increases the current flowing to the solenoid 103 thus causing it to open the safety switch 101 against the opposition of its spring 104. In this manner, objectionable racing of the engine in consequence to blowing of the line fuses F, which is tantamount to a sudden removal of the load, is prevented.

From the foregoing description taken in connection with the accompanying drawings, it will be readily apparent that this invention provides a regulator which not only is capable of maintaining the output and voltage of the generator at a predetermined normal within close limits, but in addition, automatically coordinates the speed of the engine with the load requirements, and further, affords a complete safeguard against an overload on either the engine or the generator with additional protection against fuse blowing and other abnormal occurrences.

It is also apparent that the regulator is foolproof in its operation and requires no attention so that after the proper adjustments have been made at the factory, tampering can be prevented by sealing it within a suitable housing or casing.

It is also evident that the regulator has considerable power, being positively driven from the generator or some other suitable motive source. Consequently, there is adequate strength to permit the regulator to be used to control a number of engines and generators, and in Figure 9 one manner of utilizing the regulator to control the throttle valves of a number of engines is illustrated.

As here shown, two pistons 105 are connected with linkage 106 which is arranged to be driven from the motion produced by the rack bar 51. These pistons work in cylinders 107, which are filled with a suitable fluid and have their closed ends connected through ducts 108 with other similar cylinders 109. The cylinders 109 have pistons 110 moving therein which in turn are connected with the throttle valves 111 of the engine to be regulated through adequate linkage. The connections 108 between the sets of cylinders being formed by flexible tubing, permit the regulator to be located at a distance from the throttle valves of the engines and substantially without regard for relative positioning.

While it is desirable to control the engagement of the cone clutches through which driving force is imparted to the rheostat in one direction or the other electromagnetically, it may also be accomplished through fluid pressure, and in Figure 10 one embodiment of this concept is illustrated.

As here shown, the shaft 112 upon which the sliding pinion which meshes with the rheostat gear is mounted is tubular to provide an inlet to the space afforded by the counterbore 32' in the shaft which carries the cone of the clutch. Hence, expansion of fluid within this counterbore 32' pushes on the cone to render the clutch operative.

Fluid pressure is provided from a suitable source (not shown) through a line 113 leading to the hollow shaft 112 and having a control valve 114 interposed therein. The valve 114 may be of any suitable construction, and in the present instance comprises two shut-off plugs 115 and 116 connected by a link 117 which is medially pivoted between the plugs 115 and 116 so that they work simultaneously in opposite directions. When one is down shutting off the flow of fluid or air to the shaft 112, the other is up allowing the pressure to by-pass through an outlet 118, and when the other is down, the hollow shaft 112 is connected with the inlet 113. To actuate the shut-off plugs, a solenoid 119 is provided which attracts an armature 120 connected with the lever 117. Energization of the solenoid 119 may be controlled from the master relay in the manner hereinbefore noted.

What I claim as my invention is:

1. In a regulator for internal combustion engine driven alternating current generators: a continuously driven unidirectional motion source; mechanism to be driven from said source in one direction or the other; two normally ineffective motion transmitting means between said source and said mechanism for driving the mechanism in one direction or the other depending on which of said motion transmitting means is rendered effective; means responsive to fluctuation of the output voltage of the generator to either side of a predetermined normal for rendering one or the other of said motion transmitting means effective; means operated by the resultant motion of said mechanism for effecting a correction at the generator to restore its output voltage to normal; and means responsive to motion of said mechanism for disrupting operation of the entire plant in the event of the occurrence of an abnormal condition affecting the engine.

2. In a regulator for internal combustion engine driven generators: a continuously driven unidirectional motion source; mechanism to be driven from said source in one direction or the other; two normally ineffective motion transmitting means between said source and said mechanism for driving the mechanism in one direction or the other depending on which of said motion transmitting means is rendered effective; means responsive to fluctuation of the output voltage of the generator to either side of a predetermined normal for rendering one or the other of said motion transmitting means effective; means operated by the resultant motion of said mechanism for effecting a correction at the generator to restore its output voltage to normal; and means responsive to motion of said mechanism for disrupting operation of the entire plant in the event of the occurrence of an abnormal condition affecting the generator.

3. In a regulator for an internal combustion engine driven generator plant: a continuously driven unidirectional motion source; mechanism to be driven from said source in one direction or the other; two normally ineffective motion transmitting means between said source and said mechanism for driving the mechanism in one direction or the other depending upon which of said motion transmitting means is rendered effective; means responsive to fluctuation of the output voltage of the generator to either side of a predetermined normal for rendering one or the other of said motion transmitting means effective; means operated by the resultant motion of said mechanism for effecting a correction at the generator to restore its output voltage to normal; and means controlled by and responsive to motion of said mechanism in the event of an abnormal load condition on the plant for rendering the then operative motion transmitting means ineffective to thereby prevent further increase in output voltage.

JOHN F. CARD.